SHAPING NETWORK FOR FERRITE ATTENUATOR

Filed Dec. 20, 1962

INVENTOR.
Paul E. Malagari,
BY
H. H. Losche
Paul S. Collignon
Att'ys.

United States Patent Office 3,188,493
Patented June 8, 1965

3,188,493

SHAPING NETWORK FOR FERRITE ATTENUATOR

Paul E. Malagari, Binghamton, N.Y., assignor, by mesne assignments, to the United States of America as represented by the Secretary of the Navy Filed Dec. 20, 1962, Ser. No. 246,663
1 Claim. (Cl. 307—88.5)

The present invention relates to a shaping network for a ferrite attenuator and more particularly to a shaping network for producing a linear attenuation of radio frequency (R.F.) energy within a waveguide.

Various devices have been used in the past to provide a linear output for attenuators. For example, U.S. Patent 2,865,007, issued December 16, 1958, to Frank Gudaitis relates to a mechanical drive for a variable attenuator so as to provide a linear output. In this patent, a flap attenuator is provided which moves in and out of a slot formed in the upper broad wall of a wave guide section. The movement is programmed by a cam surface so as to vary the penetration of the flap into the plate of the waveguide so as to provide a linear output.

Mechanical devices, of the type shown in the above-described patent, have several inherent disadvantages. For one thing, most mechanical devices are bulky and add considerable weight to a unit, and both weight and space is at a premium in most airborne units. Also the frequency range of mechanical devices are severely limited.

In the present invention, a ferrite attenuator is provided within a waveguide and this ferrite attenuator produces a region of nonlinear R.F. attenuation and a region of linear R.F. attenuation. The ferrite attenuator is driven through a shaping network and feedback amplifier with the shaping network being designed so that a nonlinear current is produced only during that region of attenuator nonlinearity. The resultant attenuation obtained is a linear R.F. attenuation as a function of the shaping network input voltage over an entire range.

It is therefore a general object of the present invention to provide a ferrite attenuator that will produce a linear attenuation of R.F. energy within a waveguide.

Other objects and advantages of this invention will be readily appreciated as the same becomes better understood by reference to the following detailed description when considered in connection with the accompanying drawing wherein.

Figures 2, 3, 4, 5:
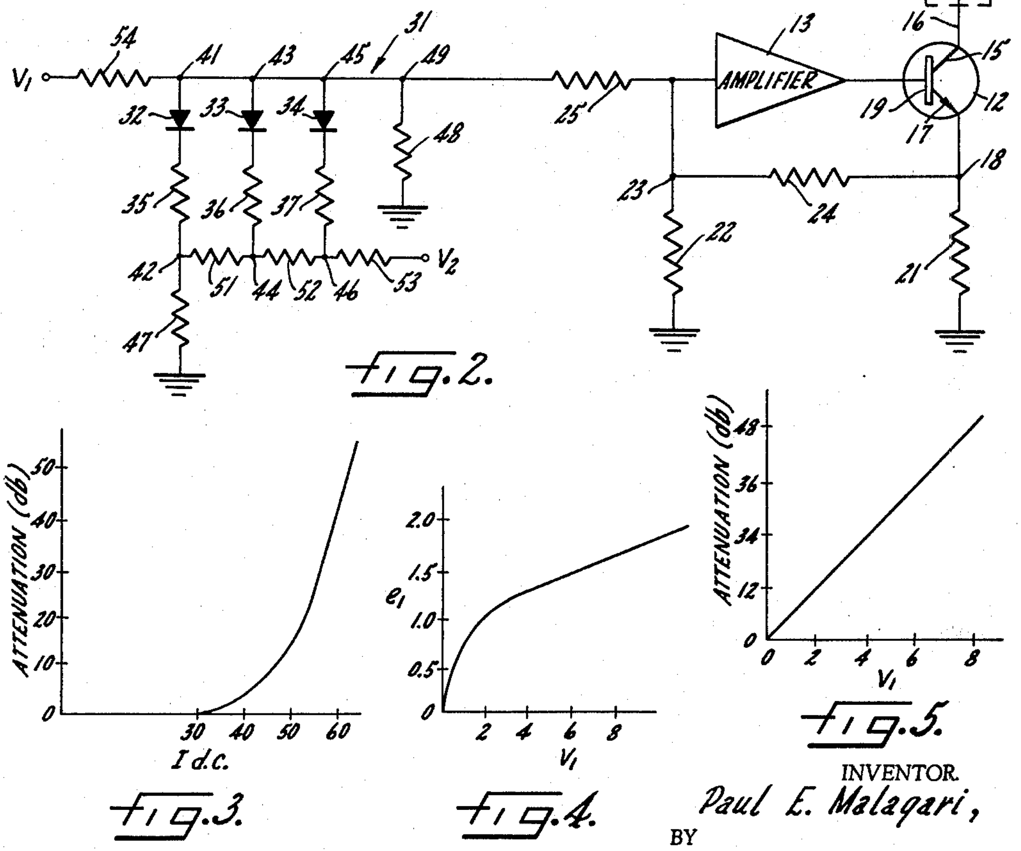
FIGURE 2 is a schematic diagram of a preferred embodiment of the present invention.
FIGURE 3 is a diagrammatic view showing a typical characteristic curve of a ferrite attenuator within a waveguide.
FIGURE 4 is a diagrammatic view showing the characteristic output vs. input of a shaping network.
FIGURE 5 is a diagrammatic view showing the resultant linear characteristic curve of R.F. attenuation vs. input voltage of a ferrite attenuator, an amplifier, and a shaping network.

Referring now to the drawing, FIGURE 3 shows a typical characteristic curve of a ferrite attenuator within a waveguide. As can be seen, the region from 0 decibels (db) attenuation to about 20 db attenuation is nonlinear and the region from about 20 db attenuation to 74 db attenuation is linear. It is the object of this invention to provide a linear attenuation from 0 to 74 db.

Figure 1:
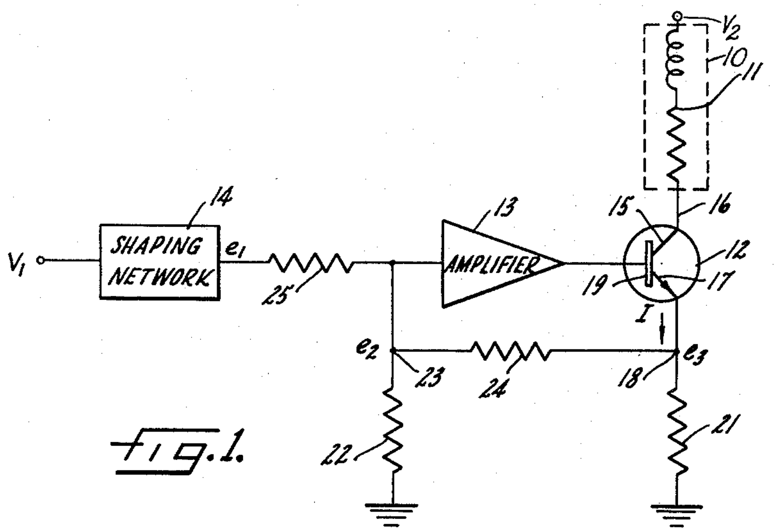
FIGURE 1 is a block diagram showing a preferred embodiment of the present invention.

Referring now particularly to FIGURE 1 of the drawing, there is shown a ferrite attenuator 11 within a waveguide 10 that will produce the characteristic curve shown in FIGURE 3 that is, as the current, $I_{D.C.}$ through the ferrite attenuator 11 is increased, the attenuation of the R.F.

energy within waveguide 10 is increased. A control network for attenuator 11 is provided and is comprised of a transistor 12, a feedback amplifier 13, and a shaping network 14. Transistor 12 has the customary collector, emitter, and base electrodes and, as shown, the collector 15 is connected to lead 16 of the attenuator 11. Emitter 17 is connected to junction point 18 and base electrode 19 is connected to the output of amplifier 13. As shown, resistor 21 is connected between junction point 18 and ground and resistor 22 is connected between junction point 23 and ground. The two junction points 18 and 23 are connected together through resistor 24. Shaping network 14, which receives an input from source $V_1$, is connected to amplifier 13 through resistor 25.

The various voltage relationship of the embodiment shown in FIGURE 1 of the drawing are as follows:

(1) $$e_1=e_2$$

(2) $$e_3=IR_{21}$$

and (3) $$e_2=\left(\frac{R_{22}}{R_{22}+R_{24}}\right)IR_{21}$$

where $e_1$=output voltage of shaping network 14;
$e_2$=voltage at junction point 23;
$e_3$=voltage at junction point 18; and
$I$=current produced by the voltage $e_1$.

Shaping network 14 is designed so that a nonlinear current is produced only during that region of attenuator nonlinearity. FIGURE 4 shows the relationship between the input, V, and the output, $e_1$, of the shaping network 14. The resultant attenuation obtained is then a linear attenuation as a function of the input voltage $V_1$, as shown in FIGURE 5 of the drawing.

Referring now to FIGURE 2 of the drawing, there is shown a diode shaping network 31 that provides an output as shown in FIGURE 4 of the drawing. Diodes 32, 33, and 34 are connected in series with resistors 35, 36, and 37, respectively, and are biased by a source of direct current voltage $V_2$. As shown, diode 32 and resistor 35 are connected between junction joints 41 and 42, diode 33 and resistor 36 are connected between junction points 43 and 44, and diode 34 and resistor 37 are connected between junction points 45 and 46. Resistors 47 and 48 are connected, respectively, between junction point 42 and ground and junction point 49 and ground. Resistor 51 is connected between junction points 42 and 44, resistor 52 is connected between junction points 44 and 46, and resistor 53 is connected between junction point 46 and voltage source $V_2$.

In operation of the embodiment shown in FIGURE 2 of the drawing, a typical characteristic curve of the ferrite attenuator 11 within waveguide 10 is shown in FIGURE 3 of the drawing. As $V_1$ is applied through resistors 54 and 25 to the amplifier 13, the diode shaping network 31 produces a nonlinear current during that region of attenuator nonlinearity. As the bias voltage applied to diodes 32, 33, and 34 is surpassed by the input voltage $V_1$, current will successively flow through diodes 32, 33, and 34, and thus cause a voltage drop across resistors 35, 36, and 37, respectively. Thus the output of the diode shaping network will have a region of nonlinearity, as shown in FIGURE 4 of the drawing. The resultant attenuation, then, is a linear attenuation as a function of the input voltage $V_1$, as shown in FIGURE 5 of the drawing.

Obviously many modifications and variations of the present invention are possible in the light of the above teachings. It is therefore to be understood, that within the scope of the appended claim, the invention may be practiced otherwise than as specifically described.

What is claimed is:

An attenuator device for producing a linear attenuation of R.F. energy within a waveguide comprising;

a ferrite attenuator within a waveguide, said ferrite attenuator having first and second input leads, a first voltage source connected to said first input lead, a transistor having emitter, collector and base electrodes, said collector electrode being connected to said second input lead, a feedback amplifier having an input and an output, said output being connected to said base electrode of said transistor, a feedback circuit connected between said emitter electrode and said input of said feedback amplifier, a diode shaping network having an output connected to said input of said feedback amplifier, and a second voltage source connected to said diode shaping network whereby a nonlinear current is provided for driving said ferrite attenuator thereby providing a linear attenuation of R.F. energy within said waveguide.

References Cited by the Examiner

UNITED STATES PATENTS

| | | | |
|---|---|---|---|
| 2,599,798 | 6/52 | Wissel | 315—27 |
| 2,694,161 | 11/54 | Holst | 315—27 |
| 2,697,201 | 12/54 | Harder | 235—197 X |
| 2,748,352 | 5/56 | Miller | 333—14 |
| 2,768,352 | 10/56 | Von Sivers et al. | 330—145 X |
| 2,817,715 | 12/57 | Blake | 333—14 X |
| 2,831,107 | 4/58 | Raymond et al. | 307—88.5 X |
| 2,879,448 | 3/59 | Putzrath | 315—27 |
| 3,054,937 | 9/62 | Long | 318—154 X |
| 3,089,968 | 5/63 | Dunn | 235—197 X |
| 3,131,298 | 4/64 | Creusere | 235—197 X |

OTHER REFERENCES

IBM Technical Disclosure Bulletin, "Linearizing Circuit," by F. J. Coychak, vol. 5, No. 3, August 1962, page 19.

JOHN W. HUCKERT, *Primary Examiner.*

ARTHUR GAUSS, *Examiner.*